(12) United States Patent
Hopkins et al.

(10) Patent No.: US 7,399,529 B2
(45) Date of Patent: Jul. 15, 2008

(54) AMINOPLAST RESIN COMPOSITION

(75) Inventors: Gregory J. Hopkins, Rome, GA (US); William C. Floyd, Chester, SC (US)

(73) Assignee: Clariant (France), Puteaux (FR)

( * ) Notice: Subject to any disclaimer, the term of this patent is extended or adjusted under 35 U.S.C. 154(b) by 25 days.

(21) Appl. No.: 11/639,765

(22) Filed: Dec. 15, 2006

(65) Prior Publication Data

US 2007/0100117 A1   May 3, 2007

Related U.S. Application Data

(62) Division of application No. 10/977,457, filed on Oct. 29, 2004, now Pat. No. 7,169,881.

(51) Int. Cl.
*B32B 27/08*   (2006.01)
*B32B 27/42*   (2006.01)
*C08G 12/30*   (2006.01)
*C08G 12/32*   (2006.01)

(52) U.S. Cl. ............ 428/502; 428/503; 427/407.1; 427/407.3; 427/412.2; 427/415; 528/254; 528/230; 528/489; 528/503; 525/398; 525/400; 525/406

(58) Field of Classification Search .......... 428/502, 428/503; 427/407.1, 407.3, 412.2, 415; 528/254, 528/230, 489, 503; 525/398, 400, 406
See application file for complete search history.

(56) References Cited

U.S. PATENT DOCUMENTS

| | | | |
|---|---|---|---|
| 3,165,424 A | 1/1965 | Konig et al. | |
| 4,379,911 A | 4/1983 | Parekh et al. | |
| 4,854,934 A | 8/1989 | Wilhelm et al. | |
| 4,968,774 A | 11/1990 | Didier et al. | |
| 4,976,997 A | 12/1990 | Stockel et al. | |
| 5,507,963 A | 4/1996 | Wolf | |
| 5,539,077 A | 7/1996 | Floyd | |
| 5,665,851 A | 9/1997 | Wilhelm et al. | |
| 5,691,426 A | 11/1997 | Floyd | |
| 5,739,260 A | 4/1998 | Floyd | |
| 5,830,978 A | 11/1998 | Floyd | |
| 6,179,885 B1 | 1/2001 | McAtee | |
| 6,201,095 B1 | 3/2001 | Floyd et al. | |
| 6,627,086 B2 | 9/2003 | Mahoney et al. | |
| 2001/0051720 A1 | 12/2001 | Waldmann | |

FOREIGN PATENT DOCUMENTS

| | | |
|---|---|---|
| CA | 2156573 | 2/1996 |
| DE | 1244393 | 7/1967 |
| DE | 3935879 | 5/1991 |
| EP | 0949253 | 10/1999 |
| EP | 1065227 | 1/2001 |
| FR | 2613361 | 10/1988 |
| FR | 2723742 | 2/1996 |
| WO | WO 9617879 | 6/1996 |

OTHER PUBLICATIONS

EPO Search Report for EP 05109992, Nov. 24, 2005.
EPO Search Opinion for EP 0510992, May 12, 2005.

*Primary Examiner*—Duc Truong
(74) *Attorney, Agent, or Firm*—Anthony A. Bisulca

(57) ABSTRACT

Resin compositions, methods of forming such resin compositions, methods of using such resin compositions and substrates treated with such resin compositions are disclosed. One of such resin compositions contains no formaldehyde and is useful as a binder. Such resin composition comprises the reaction product of:
  a—melamine,
  b—at least one aldehyde of formula (1) as defined in the specification,
  c—a cross linking agent, wherein the cross linking agent is glyoxylic acid, and
  d—at least one polyol having 2 or more than 2 hydroxyl groups.

The resin composition of the present invention can provide performance characteristics to which they are applied.

10 Claims, No Drawings

AMINOPLAST RESIN COMPOSITION

CROSS REFERENCE TO RELATED APPLICATION

This application is a divisional application of U.S. Ser. No. 10/977,457 by Hopkins et al., entitled Aminoplast Resin Composition, filed Oct. 29, 2004, now U.S. Pat. No. 7,169,881 the entire disclosure of which is incorporated herein by reference.

BACKGROUND

The present disclosure is directed generally to resins and, in particular, to aminoplast resins and their use as binders.

Among other aminoplast resins, melamine-formaldehyde resins find wide industrial application. Owing to their characteristic tensile strength and water repellence, their use is noted as binders for cellulosic, fiberglass, and polymeric materials as well as composite blends thereof. Resins without formaldehyde used for substitution of phenolic or aminoplast resins are desired due to regulatory and health concerns. In response, the industry has attempted to put forward aminoplast resins matching the functional benefits of formaldehyde-containing resins.

There exists a continuing need for thermosetting compositions without formaldehyde which perform in many applications like melamine-formaldehyde resins and exhibit for example, tensile strength compared to conventional resins.

SUMMARY OF THE INVENTION

According to one aspect, the invention encompasses a resin composition without formaldehyde comprising the reaction product of:
 a—melamine,
 b—at least one aldehyde of formula (1), $$R\text{—CHO} \tag{1}$$

in which R represents a dialkoxymethyl group, a 1,3-dioxolan-2-yl group, optionally substituted on the vertex 4 and/or 5 by one or more alkyl groups or a 1,3-dioxan-2-yl group optionally substituted on the vertices 4,5 and/or 6 by one or more alkyl groups.
 c—a cross linking agent, wherein the cross linking agent is glyoxylic acid, and
 d—at least one polyol having 2 or more than 2 hydroxyl groups.

According to another aspect, the present invention encompasses a binder comprising the aforementioned resin composition.

In still another aspect, the present invention encompasses both a method for treating a substrate with a binder disclosed herein and a treated substrate so formed.

In some instances, the resin compositions of the present invention may provide increased tensile strength, rigidity and/or water repellence to substrates to which they are applied, thereby indicating their possible potential as binders for various materials.

These and other aspects of the invention will become apparent upon review of the following specification in conjunction with the examples.

DETAILED DESCRIPTION

In one aspect, the present invention is directed to a resin composition, without formaldehyde, comprising the reaction product of:
 a—melamine,
 b—at least one aldehyde of formula (1), $$R\text{—CHO} \tag{1}$$

in which R represents a dialkoxymethyl group, a 1,3-dioxolan-2-yl group optionally substituted on the vertex 4 and/or 5 by one or more alkyl groups or a 1,3-dioxan-2-yl group optionally substituted on the vertices 4,5 and/or 6 by one or more alkyl groups.
 c—a cross linking agent, wherein the cross linking agent is glyoxylic acid, and
 d—at least one polyol having 2 or more than 2 hydroxyl groups.

The expression alkoxy represents, for example, a methoxy, ethoxy, n-propoxy, 1-methylethoxy, n-butoxy, or 2-methylpropoxy radical. As an example, the alkoxy within the dialkoxymethyl group is a methoxy radical.

The expression alkyl represents, for example, a methyl, ethyl, n-propyl, 1-methyl ethyl, n-butyl, 2-methyl propyl radical.

The aldehyde of formula (1) can be chosen from dimethoxyacetaldehyde, diethoxyacetaldehyde, dibutoxyacetaldehyde, formyl-2dioxolan-1,3 or dimethyl-5,5formyl-2dioxan-1,3 and mixtures thereof. As an example, the aldehyde of formula (1) is dimethoxyacetaldehyde.

Suitable polyols for the present invention include, but are not limited to, dialkylene glycol, polyalkylene glycol, glycerin, alkoxylated glycerin, polyvinyl alcohol, dextrose (and dextrose oligomers and derivatives), maltose, maltodextrins, glucose, starch, starch derivatives such as starch hydrolysis products, polyglycidol, polysaccharides (and derivatives) and their mixtures. As an example, diethyleneglycol, dipropyleneglycol, tripropoxylated glycerin, polyvinyl alcohol, dextrose, maltose, maltodextrins, glucose and their mixtures are used. As an example, the polyol is dextrose or a mixture of D-glucose, maltose and maltodextrins, i.e. corn syrup.

In one aspect, the reaction product comprises a molar ratio of about 1 to about 6 molar equivalents of aldehyde of formula (1) to melamine. In another aspect, the reaction product comprises a molar ratio of about 2 to about 4 molar equivalents of aldehyde of formula (1) to melamine. In one aspect, the reaction product comprises a molar ratio of about 0.01 to about 0.5 molar equivalent of glyoxylic acid to melamine. In another aspect, the reaction product comprises a molar ratio of about 0.05 to about 0.2 molar equivalent of glyoxylic acid to melamine. In a further aspect, the reaction product comprises a molar ratio of about 0.06 to about 0.1 molar equivalent of glyoxylic acid to melamine. Furthermore, the reaction product, in one aspect, comprises a molar ratio of about 0.05 to about 0.5 molar equivalent of polyol to melamine. In another aspect, the reaction product comprises a molar ratio of about 0.1 to about 0.3 molar equivalent of polyol to melamine.

According to another aspect, the invention provides a process for the preparation resins of the invention characterized by the condensation under agitation of melamine and of at least one aldehyde of formula (1) in aqueous solution, with an alkaline catalyst at a basic pH between about 8 and about 10 and at a temperature between about 20 and about 100° C. Glyoxylic acid and at least one polyol then are added, while operating with a pH between about 4.5 and about 6, at a temperature between about 20 and about 100° C. and for a time period of about 0.5 to about 12 hours.

During the first step, melamine is reacted with at least one aldehyde of formula (1) at molar ratios melamine/aldehyde of formula (1) of about 1/1 to about 1/6. In one aspect, the molar ratio of melamine to aldehyde is about 1/2 to 1/4. The reaction is made at a pH between about 8 and about 10. In one aspect the reaction is made at a pH between about 9 and about 9.5. The condensation is realized at a temperature between about 20 and about 100° C. In one aspect, the condensation is realized at a temperature of between about 40 and about 60° C. Exemplary alkaline catalysts for use with the process include sodium or potassium hydroxide. The time period depends on the temperature and on the pH and is, for example, about 2 hours for a temperature of about 50-55° C. and a pH of about 9-9.5.

Melamine is a commercial product, commercialized for example by DSM company in the form of powder.

Aldehydes of formula (1) are commercial products or can be obtained easily by example under the process described in the patent application EP-A-249,530. For example, a commercially available aldehyde that can be used in the process of the present invention is dimethoxyacetaldehyde commercialized in a 60% aqueous solution and sold under the trademark Highlink® DM by Clariant (France).

During the second step of the process, in one aspect, the precondensate obtained previously is reacted with glyoxylic acid and at least a polyol at a molar ratio of melamine/glyoxylic acid of about 1/0.01 to about 1/0.5. In another aspect, the molar ratio of melamine/glyoxylic acid is about 1/0.05 to about 1/0.2. In still another aspect, the molar ratio of melamine/glyoxylic acid is about 1/0.06 to about 1/0.1 In still a further aspect, the molar ratio of melamine/polyol is about 1/0.05 to about 1/0.5. In still another aspect, the molar ratio of melamine/polyol is about 1/0.1 to about 1/0.3. In one aspect, the pH is between about 4.5 and about 6. In a further aspect, the pH is between about 5 and about 6. In another aspect, the reaction is done at temperatures between about 20 and about 100° C. In still another aspect, the reaction is done at temperatures between about 40 and about 60° C. In one aspect, the reaction is done for a time period between about 0.5 and about 12 hours.

Glyoxylic acid used in the present invention is preferably in the form of an aqueous solution. In one aspect, industrial solutions having a glyoxylic acid content of 40 to 50% by weight are used. In another aspect, industrial solutions having a glyoxylic acid content of 40 to 50% by weight are used.

Resins in aqueous solution then are obtained which can, if desired, be diluted to obtain about 40 to about 80% of solid active. In one aspect, the resin can be between about 50 to about 60% of solid active in aqueous solution.

Although not wishing to be bound by theory, it is believed that using glyoxylic acid as a cross-linking agent provides superior cross-linking of the melamine resin relative to prior art cross linking agents. This cross linking is believed to provide enhanced functional characteristics upon the substrates to which they are applied. Such functional characteristic include, for example, increased tensile strength, rigidity and/or water repellence, comparable to the values achieved with formaldehyde resins.

The resins of the present invention are illustrated below in the Examples. Also, the resins of the present invention may improve tensile strength of cellulose substrates treated therewith.

Accordingly, in a further aspect, the present invention is directed to the use of these resins as binders for non-woven substrates such as, for example, fiberglass, nylon and polyester fibers used in building materials, air filters, or abrasive pads as well as for cellulose substrates such as, for example, automotive filters.

The resin application to the substrate to be treated is normally realized with a suitable catalyst. Suitable catalysts include, but are not limited to, hydrochloric acid, sulfuric acid, phosphoric acid, p-toluenesulfonic acid, methanesulfonic acid, aluminum salts such as aluminum chloride, aluminum hydroxychloride, magnesium chloride, zirconium sulfate, zinc chloride and their mixtures.

The catalyst generally is added in an amount of about 0.1% to about 15%, based on the weight (dry basis) of the reaction product. In one aspect, the catalyst is added in an amount of about 1% to about 10% based on the weight (dry basis) of the reaction.

The present invention also encompasses a process for binding a substrate by applying the resin composition disclosed herein to a substrate and then the curing the resin composition to the substrate. Both the application and curing step can be accomplished by any method commonly employed within the art and are within the purview of one with ordinary skill. For example, the curing step is accomplished by heating the resin composition and substrate. The quantity of resin composition applied is application specific and is, consequently, accomplished by an artisan of ordinary skill without undue experimentation.

The following are illustrative, non-limiting examples of the present invention.

EXAMPLE 1

170 g of melamine (1.35 mole) were mixed at ambient temperature with 629 g. of 60% aqueous dimethoxyacetaldehyde solution (3.6 moles) and a quantity of 8.7 g of sodium hydroxide at 20%. The temperature was raised to 50-55° C. and the batch then was heated under agitation for 2 hours at 50-55° C. while the pH was maintained at a value close to 9-9.5 (An adjustment in pH, if necessary, could be made with as much sodium hydroxide at 20% as necessary). After 2 hours of reaction, 13 g of a 50% aqueous glyoxylic acid solution (0.09 mole) and 50 g. of dextrose (0.3 mole; supplier Acros) were added and the mixture was heated under agitation at a temperature of about 55-60° C. for 1 hour and cooled. Then 127.2 g. of water was added to the mixture.

A yellow viscous liquid was obtained having a content in active solids of approximately 60% and a Brookfield viscosity of 136 mPa·s measured after 24 hours.

This resin presented a content of free glyoxylic acid of 0.06% (analysis by HPLC after passage on exchanging cartridge of anions then by using a REZEX™ column (00H-0138-KO; 300*7.8 mm)) and sulfuric acid 0.05 N as eluant with a flow of 0.5 mL/min and an UV detection at 210 nm.).

EXAMPLE 2

The resin was prepared as in the Example 1 but using 0.22 mole of glyoxylic acid for 1.35 mole of melamine.

A yellow viscous liquid was obtained with a content of active solids of approximately 60% after dilution with 108.8 g of water, and a Brookfield viscosity of 540 mPa·s measured after 24 hours.

EXAMPLE 3

The resin is prepared as in the Example 1 but using 0.54 mole of glyoxylic acid for 1.35 mole of melamine.

A yellow viscous liquid was obtained with a content of active solids of approximately 60% after dilution with 59.5 g of water, and a Brookfield viscosity of 840 mPa-s measured after 24 hours.

COMPARATIVE EXAMPLE 1

170 g of melamine (1.35 mole) were mixed at ambient temperature with 629 g of an aqueous solution of 60% of dimethoxyacetaldehyde (3.6 moles) and a quantity of 8.7 g. of sodium hydroxide at 20%. Then this mixture was heated under agitation during 2 hours at 50-55° C. while maintaining a pH at or near a range of 9-9.5.

After 2 hours reaction, 50 g. of dextrose (0.3 mole; supplier Acros) was added and the mixture then was heated under agitation at a temperature of about 55 to 60° C. during one hour and then cooled.

After dilution with 139.8 g of water, a yellow fluid liquid was obtained, having a content of active solids of approximately 60% and with a Brookfield viscosity of 126 mPa-s measured after 24 hours.

APPLICATION EXAMPLES

The resin prepared in the Example 1 was evaluated as binder on a filter paper alone or with a catalyst and compared with a resin without glyoxylic acid (comparative example 1, exemplified as C in Table 1).

Test specimens of filter paper (120*15 mm; 60 g/m$^2$) were impregnated with a roller in resins baths diluted at 60 g/l as to obtain an impregnation of 6 g/m$^2$ and then polymerized at 170° C. for 2 min., and left 3 days in an air conditioned room at 25° C. and 65% of relative humidity.

Tensile strength and breaking length then were measured with a dynanometer ZWICK (100 mm/mn) at ambient temperature.

The results obtained are presented in the Table 1 below:

TABLE 1

|  | Witness | A | B | C |
|---|---|---|---|---|
| Glyoxylic acid (%) |  | 1.3 | 1.3 |  |
| MgCl2 (% added) |  |  | 3 |  |
| breaking force (N) | 26.2 | 30.8 | 33.5 | 27.5 |
| breaking length (km) | 2.6 | 2.9 | 3.2 | 2.7 |

The above results show significant improvement of the tensile strength for cellulose paper treated with resins of the present invention compared to the comparative example C of Table 1.

It will be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing-description thereof, without departing from the substance or scope of the present invention. Accordingly, while the present invention has been described herein in detail in relation to the disclosed embodiments, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A process for binding a substrate comprising the steps of applying a resin composition to a substrate and curing the resin composition, wherein the resin composition comprises the reaction product of;
    a—melamine,
    b—at least one aldehyde of formula (1), $$R-CHO \qquad (1)$$

in which R is a dialkoxymethyl group, a 1,3-dioxolane-2-yl group optionally substituted on the vertex 4 and/or 5 by one or more alkyl groups or a 1,3-dioxan-2-yl group optionally substituted on its vertices 4,5 and/or 6 by one or more alkyl groups,
    c—a cross linking agent, wherein the crossing linking agent is glyoxylic acid,
    d—at least one polyol having 2 or more than 2 hydroxyl groups.

2. The process according to claim 1, wherein the curing step further comprises heating the resin composition.

3. A substrate made in accordance with the process of claim 1.

4. The substrate according to claim 3, wherein the substrate is selected from the group consisting of cellulosic, fiberglass, polymeric materials and composite blends thereof.

5. The substrate according to claim 3, wherein the substrate is selected from the group consisting of polyester, nylon and cellulosic substrates.

6. A process for binding a substrate comprising the steps of applying a resin composition to a substrate and curing the resin composition, wherein the resin composition is made by a process including the steps of condensing, under agitation, a melamine and at least one aldehyde of $$R-CHO \qquad \text{formula (1)}$$

in which R is a dialkoxymethyl group, a 1,3-dioxolan-2-yl group optionally substituted on the vertex 4 and/or 5 by one or more alkyl groups or a 1,3-dioxan-2-yl group optionally substituted on its vertices 4,5 and/or 6 by one or more alkyl groups, in aqueous solution and in the presence of an alkaline catalyst, at a basic pH between about 8 and about 10 and at a temperature between about 20 and about 100° C. to form a reaction mixture and, adding to the reaction mixture a cross linking agent and at least one polyol having 2 or more than 2 hydroxyl groups, wherein the cross linking agent is glyoxylic acid, and wherein the adding step is conducted at a pH between about 4.5 and about 6, at a temperature between about 20 and about 100° C. and for a time period of about 0.5 and about 12 hours.

7. The process according to claim 6, wherein the curing step further comprises heating the resin composition.

8. A substrate made in accordance with the process of claim 6.

9. The substrate according to claim 8, wherein the substrate is selected from the group consisting of cellulosic, fiberglass, polymeric materials and composite blends thereof.

10. The substrate according to claim 2, wherein the substrate is selected from the group consisting of polyester, nylon and cellulosic substrates.

* * * * *